United States Patent
Moskowitz et al.

(10) Patent No.: US 7,479,881 B2
(45) Date of Patent: Jan. 20, 2009

(54) SYSTEM AND METHOD FOR RFID TAG HOLE PUNCHER

(75) Inventors: Paul A. Moskowitz, Yorktown Heights, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 11/462,725

(22) Filed: Aug. 7, 2006

(65) Prior Publication Data

US 2008/0030337 A1   Feb. 7, 2008

(51) Int. Cl.
    *G08B 13/14* (2006.01)
(52) U.S. Cl. .................................. 340/572.1
(58) Field of Classification Search ............ 340/572.1
    See application file for complete search history.

(56) References Cited

U.S. PATENT DOCUMENTS

| | | | |
|---|---|---|---|
| 4,513,199 A * | 4/1985 | Sidline | 235/449 |
| 4,587,410 A * | 5/1986 | Milnes | 235/382 |
| 4,802,944 A | 2/1989 | Benge | |
| 4,846,922 A | 7/1989 | Benge et al. | |
| 5,187,466 A | 2/1993 | Pichl | |
| 5,574,431 A | 11/1996 | McKeown et al. | |
| 6,104,311 A * | 8/2000 | Lastinger | 340/10.51 |
| 6,421,013 B1 * | 7/2002 | Chung | 343/700 MS |
| 6,535,175 B2 * | 3/2003 | Brady et al. | 343/795 |
| 2005/0012616 A1 * | 1/2005 | Forster et al. | 340/572.7 |
| 2006/0033624 A1 * | 2/2006 | Copeland et al. | 340/572.7 |
| 2006/0040181 A1 * | 2/2006 | Kim et al. | 429/211 |
| 2006/0243796 A1 * | 11/2006 | Macklin et al. | 235/382 |
| 2006/0277107 A1 * | 12/2006 | Beal et al. | 705/14 |
| 2007/0151660 A1 * | 7/2007 | Adams et al. | 156/238 |
| 2007/0241178 A1 * | 10/2007 | Withum | 235/376 |

* cited by examiner

*Primary Examiner*—John F Mortell
(74) *Attorney, Agent, or Firm*—Cantor Colburn LLP; Dwayne Nelson

(57) ABSTRACT

A system including an RFID tag reader and a hole punch apparatus to punch a hole in an RFID tag. The hole punch punches a hole in the RFID tag to affect the functioning of said RFID tag. The system may also interrogate the RFID tag before and after the hole punching to confirm the affect on the RFID tag.

4 Claims, 4 Drawing Sheets

SYSTEM AND METHOD FOR RFID TAG HOLE PUNCHER

CROSS-REFERENCE TO RELATED APPLICATIONS

This application contains subject matter which is related to the subject matter of the following co-pending applications, each of which is assigned to the same assignee as this application, International Business Machines Corporation of Armonk, N.Y. Each of the below listed applications is hereby incorporated herein by reference in its entirety:

SYSTEM AND METHOD FOR DISABLING RFID TAGS, filed Sep. 22, 2004, application Ser. No. 10/946,975; and SYSTEM AND METHOD FOR ALTERING OR DISABLING RFID TAGS, filed Jan. 13, 2006, application Ser. No. 11/332,613.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

The present invention is related to providing-wireless portable transponders, such as cards and RFID tags, with user controlled means for disabling the tags as protection from an unauthorized interrogation. More particularly, the invention provides mechanical means that permit a user to decide to alter or disable a tag and observe that the tag has been effectively altered or disabled when transponder reception/interrogation of personal or other information is undesirable.

2. Description of Background

Portable transponders employ RFID, Radio Frequency Identification, as the technology used to collect highway tolls, to serve as personal identification for access control, and to provide means for electronic information interchange, such as credit, etc. Passive RFID tags (i.e. tags without internal power sources such as batteries) and wireless cards contain chips, (also known as computer chips, microchips, memory chips) which store identification and other information, such as credit card numbers, financial data, etc. Tags may be applied to items to identify the item in much the same way that bar codes are used for identification purposes. Information is retrieved from a tag as well as the wireless cards of the present invention by an RFID base station or reader when the tag or card is scanned with radio waves by the reader. The tags may draw their power to function from the interrogation field supplied by the base (read/write) station.

Passive tags are described in U.S. Pat. No. 3,713,148, Card Apparatus and System, issued to Cardullo and Parks. In its simplest form the RFID tag or device includes a circuit, typically a silicon chip, although more than one chip may be used in the construction of the RFID device. The circuit is generally connected to an antenna. The RFID device or card may tale on a variety of forms including that of a tag, a key fob, or a card. For battery assisted tags, sometimes referred to as semi-passive or semi-active, a battery may also be employed to extend the range of the device. It is also possible in principle to build devices that function as tags or wireless cards using electrical circuits including only resistors, capacitors and inductors as is well known by those skilled in the art.

Large scale retailers and their suppliers are pursuing radio frequency identification, RFID, tagging for supply chain tracking of goods. Demonstrations of RFID for item tagging will lead to point of sale, POS, check out and data collection. For the item tagging application, RFID tags are attached to some part of an item that is being inventoried or is for sale. The tag will in many cases remain attached to the item that has been sold to a customer. This makes it possible for the tag to be read after the point of sale. This in turn leads to a question of the privacy of the purchaser or customer. The issue of privacy is of utmost concern. It is therefore desirable under some circumstances to deactivate or disable the RFID tag after the point of sale without having to physically remove the tag. Deactivation of the tag is one way to assure privacy.

The EPCglobal Generation 2, Gen2, RFID protocol includes a kill command that renders the tag inoperable. This kill command is often referred to as a "Privacy" command— which can be used to permanently deactivate the device at the end of its working life, for example as a customer leaves a store. However, there are problems associated with the kill command. If the kill command permanently disables a tag, then the tag may not be used for future applications including use of the tag for recalls or returns.

SUMMARY OF THE INVENTION

The shortcomings of the prior art are overcome and additional advantages are provided through the provision of a system comprising: an RFID tag reader; a hole punch apparatus to punch a hole in an RFID tag; and said hole punch punching a hole in said RFID tag to affect the functioning of said RFED tag.

Other embodiments include a system comprising: an RFID tag with an antenna; and at least one location index on said RFID tag indicating at least one position for a hole to be punched in said RFID tag.

Other embodiments include a method comprising: reading an RFID tag; making a first determination of the read distance of said RFID tag; punching at least one hole in said RFID tag; providing an indication that the tag has a specific read distance.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Embodiments of the invention provide methods, systems and apparatus to protect wireless transponders, such as RFID tags that may be carried on a person, from an unauthorized interrogation. Such tags have means for receiving and storing electronic information, commonly in binary form using memories and/or electronic circuits, typically, but not exclusively such as chips containing 'bits' to store the information. Embodiments of the invention are designed to provide privacy of this type of electronic information and yet permit the information to be queried later through wireless means at close range at the user's discretion. At the same time the tags can be protected from receiving unauthorized or unwanted information. The disabling of the tag to prevent interrogation of the RFID involves physically punching out at least a portion of an interrogation circuit e.g. an antenna section in the RFID tag or punching out or disabling the chip on the RFID tag.

Figure 1:
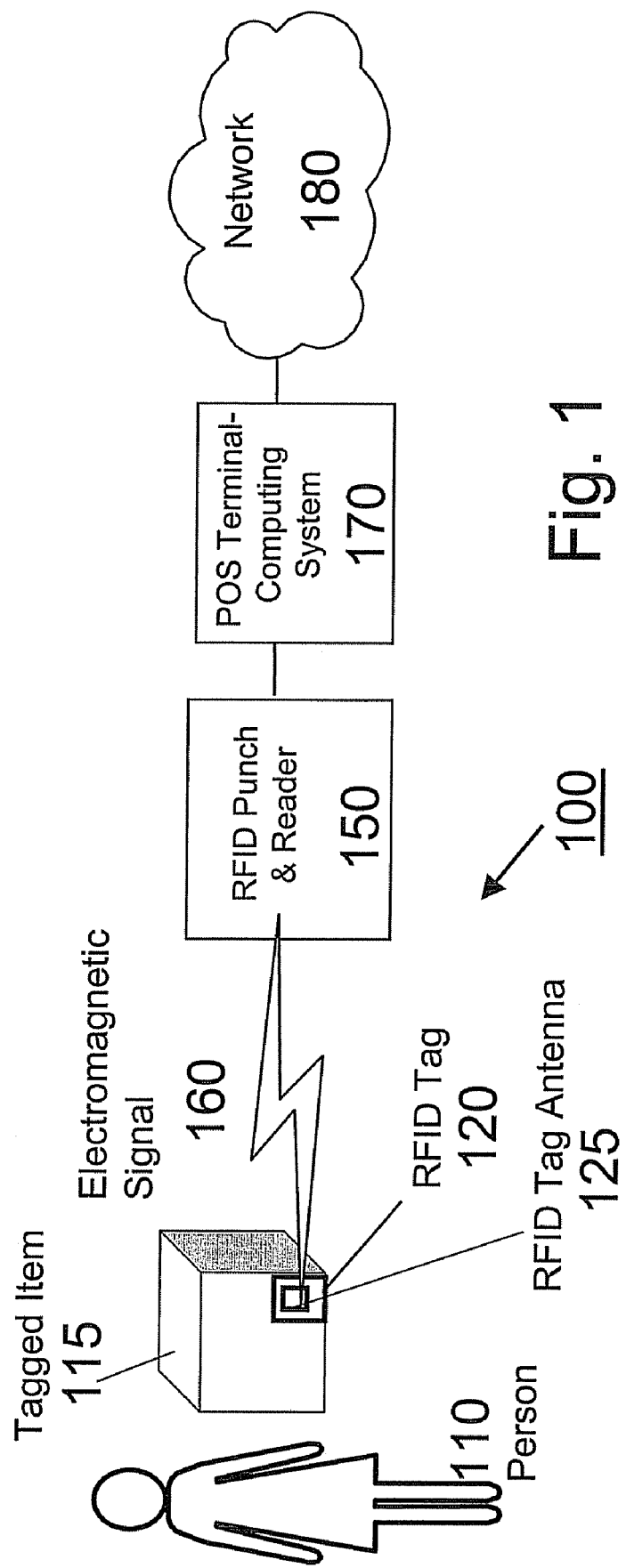
FIG. 1 illustrates an example of a system of the invention.

FIG. 1 illustrates an exemplary system 100. A person 110 carries at least one tagged item 115 which has at least one wireless or RFID tag 120 attached to the item 115, the tag being interrogated by an RFID reader 150 which may be located at a point of sale, POS, terminal, the reading transmitted to a local computing system 170 or to a remote computing system by means of a computing network 180. The RFID reader may incorporate a punch which may be used to punch a hole or holes in a selected region of the tag. The puncher/reader and or POS system may be a handheld or portable device or may be incorporated into a device such as an RFID reader device, that is not mobile, e.g. self-checkout machine, cash register, exit door, or kiosk. The puncher may be located within other devices such as cash registers, retail store exit doors, walls near exit doors, kiosks, or self-checkout machines. In configurations where it is not convenient to have the RFID interrogation electronics closely integrated with the hole puncher mechanism, then such electronics may be at a remote location and connected, for example, by a wired or wireless connection. The RFID tag has an antenna 125 connected to a chip on the tag which provides a means for communication to the chip. The tag may be read through the use of an electromagnetic, EM, signal 160 that provides means for communication between the tag 120 and the reader 150. EM signals may have an electric or a magnetic component or both. Information received by the reader 150 may be transferred to a computing system 170 where it is processed and stored in a database. The system 170 may in turn be connected to a network 180 which makes possible the exchange of information with other computing systems. In order to protect the privacy of the person 110, the tag 120 is constructed in such a way that the response from the tag 120 may be modified in such a way that the reading range of the tag may be made a fraction of its maximum range, e.g. a tag that may be read at 10 meters may have its range reduced to a few cm or any value in between. This may be accomplished by means of a command send from the reader 150 to the hole puncher instructing the hole puncher to punch a hole or holes in the tag 120 to modify the functioning of the tag. After the initial hole or holes are punched, the reader may interrogate the tag to determine its function and then have more holes punched if necessary to achieve a certain level of performance. Such modification may be accomplished by a command sent from the reader to the hole puncher at the request of the person who has purchased the tagged item to protect that person's privacy. The functions and measurements performed by the reader and the hole puncher are controlled by the computing system 170 or are controlled remotely through the network 180.

The point of sale terminal may be associated with a database which records particulars of holes punched in RFID tags and sales of particular items. The POS terminal may communicate with the hole punch and reader system by wireless means. These include Bluetooth or WiFi. The particulars of the holes may include details of shapes and sizes. The particulars of sales of particular items may include location of store, or checkout location, or checkout clerk, time, date, price, details of the item (e.g. manufacturer code, product code, serial number), price, and identification of the purchaser. The database may be employed later to confirm the details of a sale for returned or recalled items.

Figure 2:
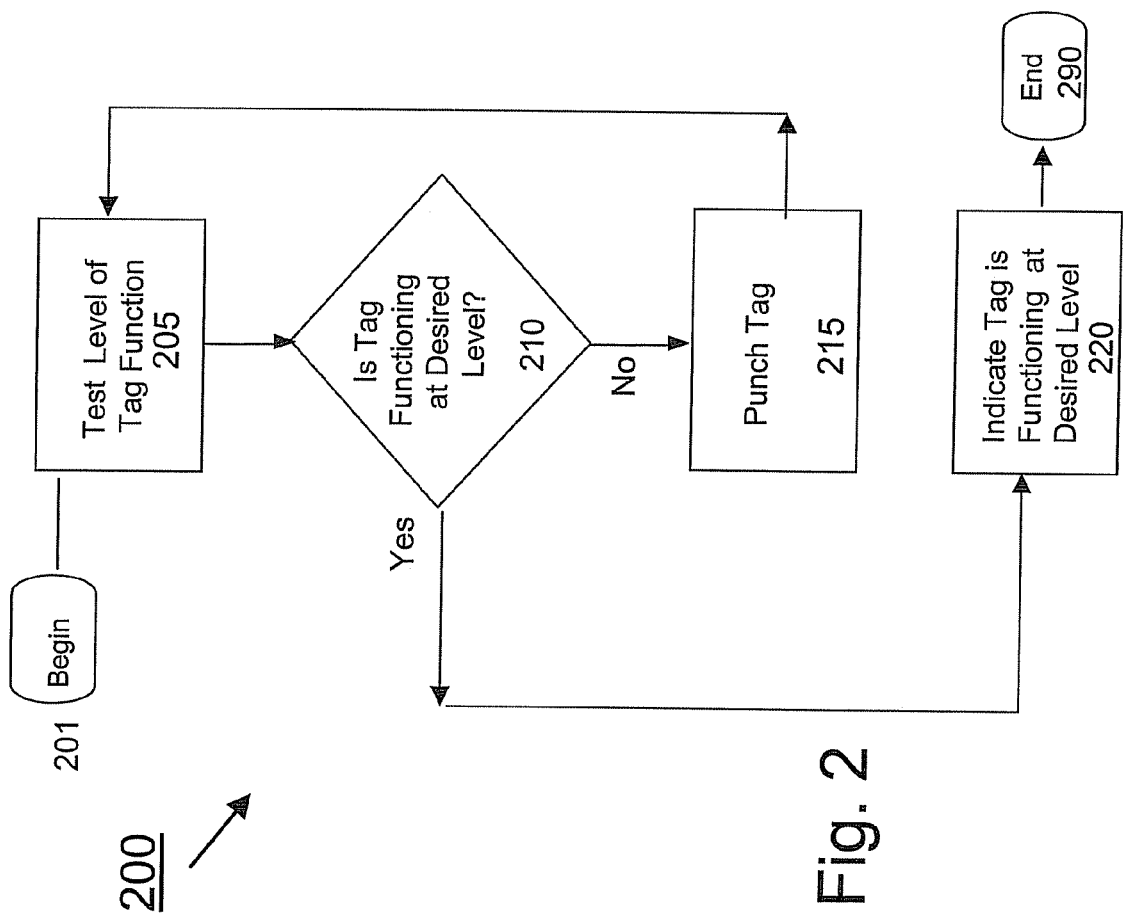
FIG. 2 shows a flow diagram illustrating a disabling function.

FIG. 2 shows a flow diagram 200 illustrating the disable function. In order to be able to assure a consumer that a tag has been deactivated or partially deactivated, we provide a method, FIG. 2, wherein there is confirmation of the deactivation of an RFID tag by physical inspection or electronic confirmation. Tags are deactivated by the physical punching of a section of the tag antenna. Alternatively, tags can be totally deactivated or destroyed by punching the chip from the tag.

In the normal state of use for a tag, the tag is functioning and may be confirmed to be functioning by means of a test 205. This functioning at a desired level may be an indication of the read distance of the RFID tag. The test may consist of placing the tag within the field of an RFID reader, and then using the RFID reader to read information held in the memory of the chip on the RFID tag. If continued functioning at the measured level is desired 210, no more is done. However, the consumer or user may be provided with an indication of the level of functioning or read distance of the tag 220. Such an indication may be a statement displayed on a display screen or indicated by a light or sound. The hole itself may provide such an indication. If the functioning is not desired 210, e.g. the user wishes that the tag may not be read at the distance that it is now able to be read by wireless means, the antenna is disabled by punching the tag 215. This reduces the read distance. It also reduces the write distance, the distance at which the tag may have data added to it. This is an added benefit. The disabling of the antenna is accomplished by mechanical punching as described in the figures below. Additionally, the disabling of the antenna function may be confirmed by visual inspection. After the tag is disabled, the disabling may be confirmed by an indication 220 as described above. However, visual inspection is the preferred method to determine the tag has been disabled. Note also that the act of triggering the physical hole-punch operation may also trigger the interrogation of the RFID, before and after the hole is made. Also, it is possible to use the first reading of the tag to trigger the hole punch. If the read distance is not as desired after a first punching and reading, a second and subsequent punchings may take place. Various items of information may be collected at the time the hole is punched, such as the shape or physical characteristics of the hole or holes, and number of the holes punched and the time of day, or date. The physical characteristic may be simply that the hole has been punched. An optional inking mechanism may be associated with the hole puncher so that when the hole is punched, for example punched by a moving rod, the punching rod leaves a small colored mark at the edges of the hole. This color may be used to convey information associated with the clerk, the shopper, the store, the date, expiration date, and the nature of the item purchased. Additionally, the shape of the hole-puncher rod may be used to convey such information. The shape may be changed, for example, by having one or more rods that punch together to form a particular shape. Note that embodiments of the invention is not limited to use with retail store items but may have application in diverse arenas that range from the punching of passports with RFID tags to use by lending institutions such as libraries and use for: equipment/personnel tracking in hospitals, inventory control, container/pallet tracking, ID badges and access control, fleet maintenance, parking-lot access and control, car tracking in rental lots, and product tracking through manufacturing and assembly.

Alternatively, if the object is simply to have the tag totally disabled, there is no need to first test to see if the tag is enabled. Rather, the mechanical disconnection of the antenna connection to the chip or the mechanical destruction of the chip or the antenna is adequate to assure that wireless radio signals will not be received and will not be conveyed to the chip. This will disable the tag. The disconnection or punching out of the chip may be confirmed by visual inspection.

Figure 3A:
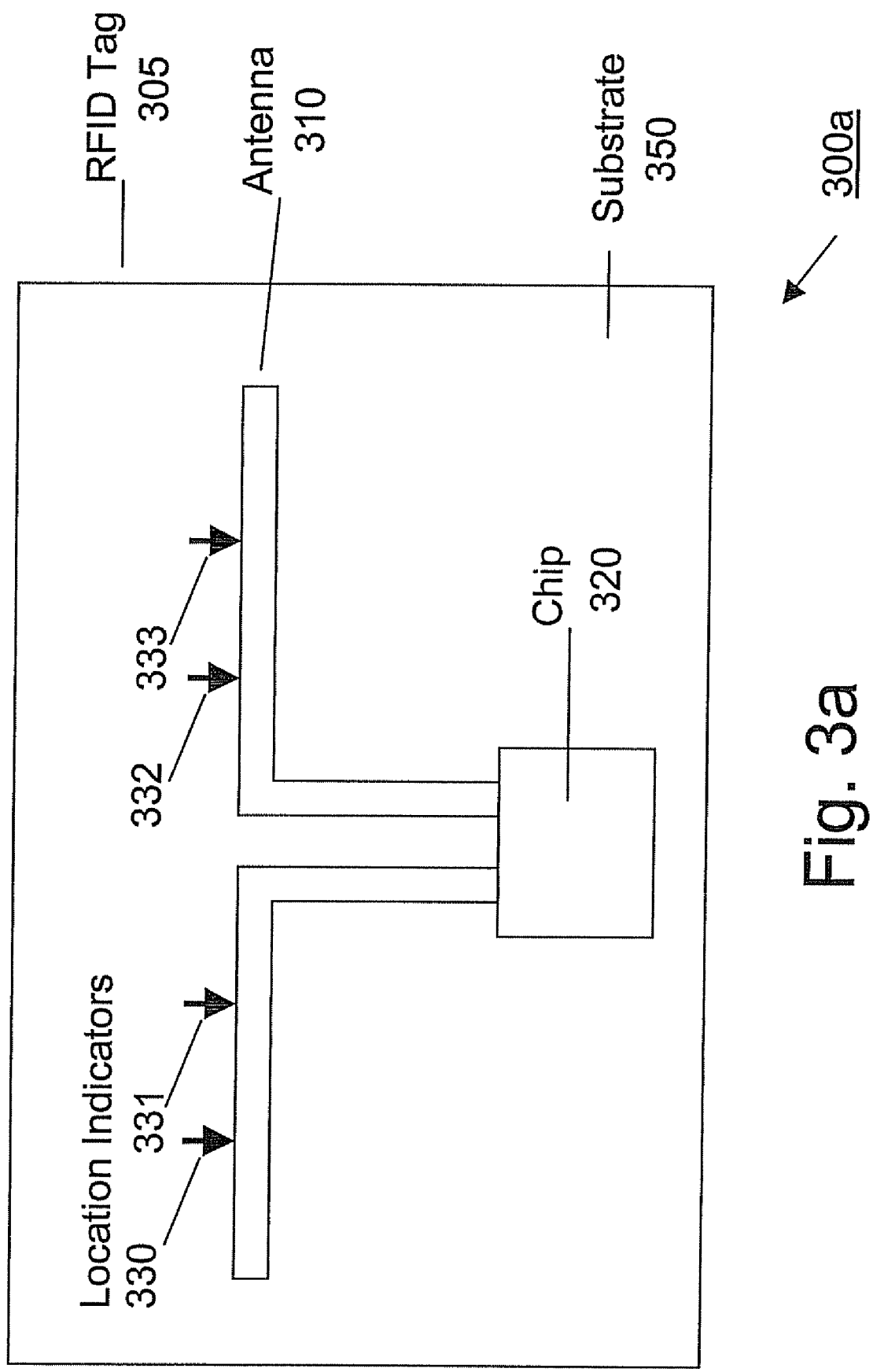
FIG. 3a is an example of an RFID tag comprising punch location indicators.

FIG. 3a is an example of an RFID tag that may be disabled by a mechanical means 300a. In our system, the antenna 310 of the RFID tag 305 is manufactured upon a substrate 350. The substrate 350 or mounting means may be a plastic material such as polyimide or polyester. The chip 320, also called a memory chip, is mounted on the substrate and is connected to the antenna 310 by an electrical conductor or conductors. The substrate may have printed or otherwise deposited on it, indicators 330, 331, 332, 333, showing where to punch holes in the antenna in order to achieve a certain level of read range.

Such tags are placed on the article or on its packaging in such a way that the antenna or the chip connection may be punched by a punch device associated with a reader, either fixed or handheld, that may be associated with a POS terminal. Thus, the consumer or a check-out attendant in a retail establishment may request the operation to disable or partially interrogation of the tag. The tag is open for visual observation for the confirmation of the disabling of the tag.

Figure 3B:
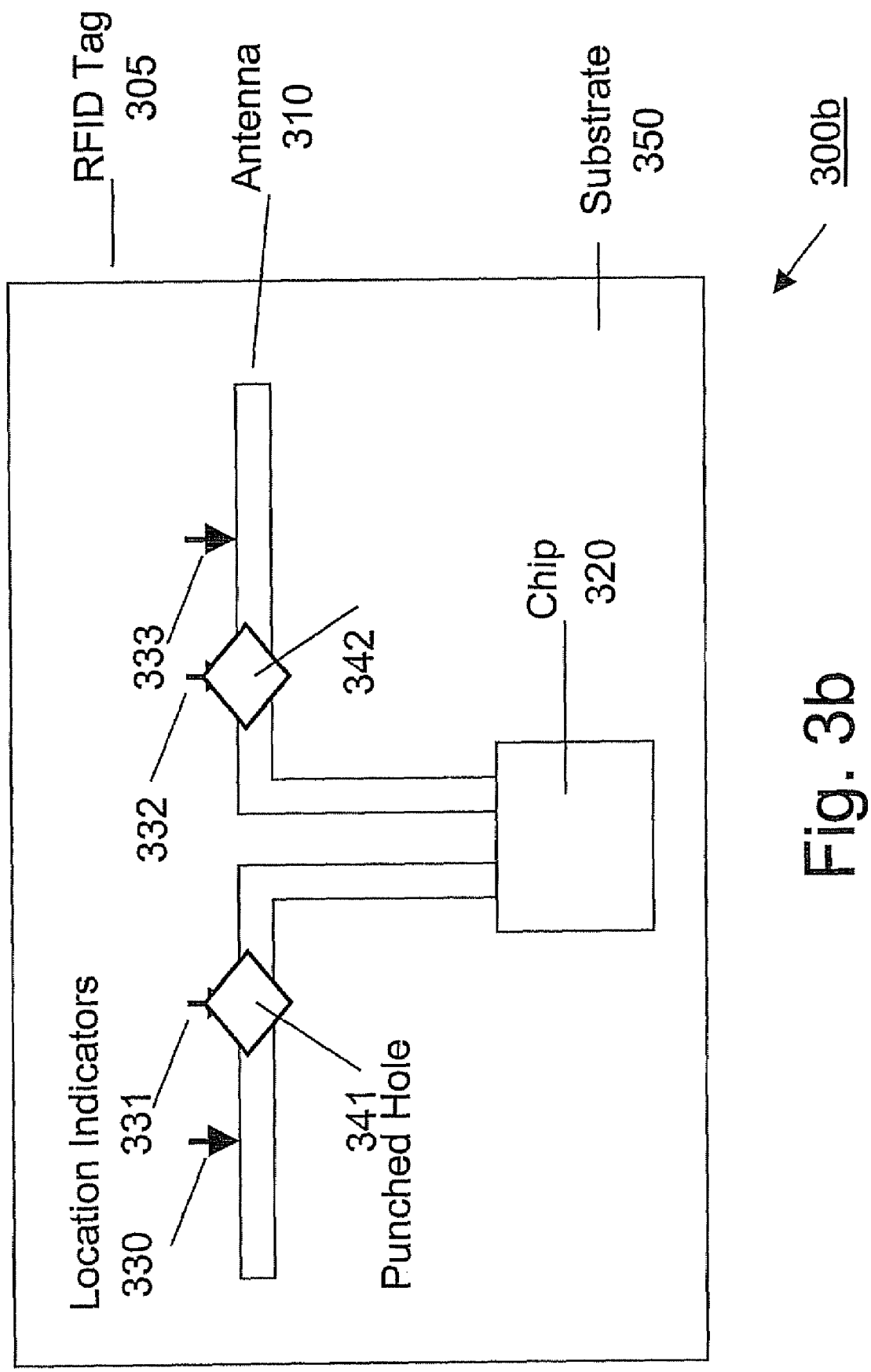
FIG. 3b is an example of an RFID tag after punched holes have been placed in the tag.

FIG. 3b is an example of an RFID tag that has been disabled by a mechanical means 300b. The punched holes, 341 and 342, are at locations that were indicated by the location indicators 331 and 332. The antenna 310 has now been effectively shortened in such a way that it is no longer resonant at its chosen frequency of operation. Its impedance no longer matches that of the chip and its capture area has been reduced. Thus, the antenna is less efficient and the range of the tag has been reduced. If the locations 330 and 333 had been chosen instead of 331 and 332 for the punching operation the range would not have been reduced as much. For example, a tag with a read range of 10 meters may have a read range of 10 cm when punched at 331 and 332, but a range of 80 cm when punched at 330 and 333.

The holes punched 341 and 342 are shown as diamond shapes. The shape of the holes will not effect the reduction in range, but may be use to indicate the company that has sold a particular item, or the store where the item was sold, or the particular POS used. Other shapes that may be used are round, oval, square, multisided, or irregular, etc. multiple punching elements may be employed to produce different holes of different characteristics, e.g. different shapes or sizes.

Thus the hole, or holes punched are of a discemable shape and may also vary in size. The different and shapes sizes may be discemable upon casual viewing by a person or when viewed though a specialized optical apparatus such as a camera, a vision system, or a magnifying glass or microscope.

When punching RFED tags, retail clerks leave a mark (shape) that is unique. Thus, the RFID puncher is a vital form of identification for the store. Stores may ensure each punch is unique, for example the shape is diamond, heart, club, or spade and modifications thereof may be used. Store chain may tweak some of the shapes in minuscule yet identifiable ways.

It is also possible to leave the antenna and tag largely intact, but to totally disable the tag by punching out the chip 320. This may be employed for tags that are to be used for one time only or after the last use of a multi-use tag, card, or ticket. Examples include, fare token cards, sporting, entertainment, cultural or other event admissions, discount coupons e.g. for retail purchases, etc. In that use, the remaining card no longer has wireless read ability, but may be held as a physical indication that payment has been tendered. The RFID tag with at least one position punched may be employed by a library, hospital, parking-lot access control, or rental car lot control.

Embodiments of the invention provide transponder information exchange privacy and control by providing tag structures that make it possible for a user to mechanically alter the tag in such a way so as to inhibit the ability of a base station or reader to interrogate the RFID tag or transponder by wireless means for those tags that are readily accessible by the holder of the tagged item.

Embodiments of the invention to provide a system and method for the permanent deactivation or disabling of wireless RFID tags. It is further the aim of this invention to provide a system and method for the visual confirmation that a tag has been deactivated. Another aspect of the present invention, is to enable a holder of a tag or tagged item to protect his/her privacy by altering or deactivating the RFID tag at will, while also making it possible for an establishment to interrogate the tag at the holder's discretion by means of wireless close range, e.g. proximity probing or interrogation and this result of this altering is visible to the consumer Embodiments of the invention provide a method of altering interrogation characteristics of a resonant tag, the method comprising obtaining a resonant tag, the resonant tag comprising an antenna; and reducing a read range of the resonant tag via physically compromising at least a portion of the antenna of the resonant tag by means of mechanical punching. The punching affects the functioning of the RFID tag.

Embodiments of the invention provide a system incorporating with an RFID reader and also a point of sale, POS terminal, a mechanical punch which may punch one or more holes in an RFID tag.

Embodiments of the invention provide RFID tags or labels comprising location indicators that may be serve as locations for punching so as to provide the possibility of various degrees of partial deactivation of the RFID tag, e.g. to provide reference points for pre-specified RFID tag read distances.

Embodiments of the invention provide a multiplicity of punch shapes and sizes, or physical characteristics or details of the holes, in order to make possible the identification of the punching machine. The identification may be to a particular retailer, a particular store, or a particular POS at a particular store, or may be associated with a specific checkout clerk.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention.

The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system comprising:
    an RFID tag reader;
    a hole punch apparatus to punch a hole in an RFID tag;
    wherein said hole punch punches a hole in said RFID tag to affect the functioning of said RFID tag; and
    a point of sale terminal associated with a database which records physical characteristics associated with holes punched in RFID tags and sales of particular items.

2. The system of claim 1 wherein said system is one of a handheld device, self-checkout machine, cash register, exit door, and kiosk.

3. The system of claim 1 further comprising an inking mechanism associated with said hole puncher, wherein ink is transferred to said RFID tag upon said punching.

4. The system of claim 1 wherein said hole is at least one hole punched.

* * * * *